United States Patent Office
3,157,611
Patented Nov. 17, 1964

3,157,611
AQUEOUS FILM FORMING COMPOSITIONS CONTAINING POLYVINYL ALCOHOL AND A PHOSPHATE ESTER
Martin K. Lindemann, Somerville, N.J., assignor to Air Reduction Company, Incorporated, New York, N.Y., a corporation of New York
No Drawing. Filed May 12, 1961, Ser. No. 109,524
5 Claims. (Cl. 260—29.6)

This invention relates to a plasticized polyvinyl alcohol composition. More particularly the invention relates to a composition containing polyvinyl alcohol having a percent hydrolysis of from 79 to 86% which is plasticized with a phosphate ester and to an aqueous film forming composition which is especially useful for the preparation of cold water soluble polyvinyl alcohol films.

Various compositions have been proposed for making cold water soluble films for use in preparing packages for such materials as soap, detergents, bleaches, insecticides, medicinals, and dyes. In order for a material to be acceptable as a cold water soluble film for packaging purposes it is necessary that the film possess certain specific properties. First, of course, the film must be soluble in cold water and still possess the necessary strength and flexibility in order to allow handling of the film prior to use. Second, the film must be stable over the extremes of temperature and humidity conditions which are encountered in the normal distribution of the product. The film must retain its cold water solubility, flexibility and strength when subjected to both high and low temperatures and high and low humidity. It has been particularly difficult to prepare a film which is both cold water soluble and flexible when subjected to low temperatures. A further problem is presented in developing a film that is cold water soluble and does not become tacky when subjected to high humidity conditions.

Many attempts have been made to modify polyvinyl alcohol such as by ethoxylation and many plasticizers have been suggested for polyvinyl alcohol in order to produce a material which is acceptable for producing films which are readily dissolved in water. It has been suggested that polyvinyl alcohol be plasticized with various humectant type plasticizers, such as glycerin, ethylene glycol, amides such as ethanol acetamide and ethanol formamide; however, polyvinyl alcohol films which are plasticized with these humectant type compounds are known to absorb water when subjected to high humidity conditions, thus resulting in films which are tacky and possess low strength.

It is, therefore, an object of the present invention to prepare a polyvinyl alcohol composition from which films may be formed which are cold water soluble, possess good mechanical properties and good low temperature flexibility. Other objects and advantages of the present invention will become apparent from the following description.

It has been discovered that a polyvinyl alcohol composition from which films having the desirable properties described above may be formed by plasticizing polyvinyl alcohol having a degree of hydrolysis of from about 79 to 86% with from about 30 to 45 parts by weight, based on 100 parts of polyvinyl alcohol, of a phosphate ester.

The polyvinyl alcohol which is employed in the present invention is one having a degree of hydrolysis of from about 79 to 86%. As is well known, polyvinyl alcohol is prepared in two steps. First, a vinyl ester such as vinyl acetate is polymerized. Normal polymerization procedures which are well known in the art may be employed. While the present invention is not limited in the method of polymerization of the vinyl acetate it appears that an especially advantageous composition may be obtained if the vinyl acetate is polymerized in such a manner so as to produce a polyvinyl acetate which has a relatively uniform degree of polymerization. The second step in the production of polyvinyl alcohol is the saponification or hydrolysis of the polyvinyl acetate to polyvinyl alcohol. In this step the ester groups, such as acetate groups, are converted to hydroxyl groups. The procedure employed for the hydrolysis of polyvinyl acetate to polyvinyl alcohol is well known in the art and is typically carried out by either an alkali or acid type hydrolysis. The degree or percent hydrolysis of polyvinyl alcohol refers to the number of acetate groups which have been converted to hydroxyl groups. It should be pointed out that the degree or percent hydrolysis of polyvinyl alcohol represents an average value, and thus some difference may be present in different samples of polyvinyl alcohol having the same degree or percent hydrolysis. For this reason it is especially desirable in practicing the present invention that the polyvinyl alcohol be hydrolyzed in such a manner that the polymer chains contain approximately the same number of hydroxyl groups.

It is imperative for the practice of the present invention that the polyvinyl alcohol possess a degree or percent hydrolysis of from 79 to 86%, i.e., from 79 to 86% of the acetate groups are converted to hydroxyl groups. Polyvinyl alcohol which is hydrolyzed above 86%, i.e., from 86 to 100%, is not acceptable for the practice of the present invention, since the phosphate ester is not sufficiently compatible with these types of polyvinyl alcohol, and thus the films formed therefrom contain lower quantities of phosphate ester and do not pass the low temperature flexibility test required for use of these materials in water soluble packaging. It has been discovered that the compatibility of the phosphate ester with polyvinyl alcohol increases as the percent hydrolysis decreases, and in order to achieve a satisfactory product a percent hydrolysis of 86% or below is required. Further, as the percent hydrolysis of the polyvinyl alcohol is raised above about 90% the cold water solubility of films formed therefrom decreases and thus the films do not possess satisfactory cold water solubility. The lower limit of hydrolysis is determined by the cloud point of the polyvinyl alcohol. As the percent hydrolysis decreases the cloud point also decreases. If the temperature of the casting solution or casting surface is above the cloud point of the polyvinyl alcohol, the polyvinyl alcohol will tend to precipitate as the film is formed thus adversely affecting the mechanical properties of the film. Also, the lowering of the cloud point of the polyvinyl alcohol lowers the hot water solubility and it is important for many applications such as formation of packages for use in a washing machine that the film be hot water soluble. In the practice of the present invention it is especially preferred to employ polyvinyl alcohol having a degree of percent hydrolysis of from 80 to 84%.

Polyvinyl alcohol in addition to being available in varying degrees of hydrolysis is also available in varying viscosities. The viscosity is determined by the degree of polymerization of the polyvinyl acetate from which the polyvinyl alcohol is obtained. For purposes of the present invention, the polyvinyl alcohol viscosity measured in a 4% aqueous solution at 20° C. may be about 2 to 60 centipoises. The compatibility of the phosphate ester plasticizer of the present invention decreases somewhat as the viscosity increases; therefore, it is sometimes necessary when employing a relatively high viscosity polyvinyl alcohol to keep the percent hydrolysis at the lower end of the range is order to insure adequate compatibility.

The phosphate ester which is employed as the plasticizer of the present invention may be represented by the following general formula $$(C_4H_9O)_xPO[O(CH_2CH_2O)_yH]_{3-x}$$

wherein $x$ is an integer from 1 to 2 and $y$ is an integer from 1 to 4. The phosphate ester may be prepared by reacting a mono or dibutyl acid phosphate or mixture thereof with ethylene oxide. A suitable phosphate ester plasticizer is Vircol 189. In order to produce a polyvinyl alcohol film having the desirable properties, particularly good low temperature flexibility, at least 30 parts of the phosphate ester must be added to 100 parts of polyvinyl alcohol. It is preferred to add at least 35 parts of the phosphate ester in order to insure that adequate plasticizer is present. The upper limit of phosphate ester which may be added is defined by the compatibility of the phosphate ester with the grade of polyvinyl alcohol. For most grades within the limits set forth above the maximum amount of plasticizer is from 45 to 50 parts per 100 parts of polyvinyl alcohol. The point at which the plasticizer becomes incompatible with the polyvinyl alcohol may be readily determined by a number of methods such as by preparing a film and examining it for haziness as haziness in a film may be caused by an excess of plasticizer. Exuding of a film also may indicate the presence of an amount of plasticizer which is above the compatible amount. Also as the amount of plasticizer increases the elongation increases and tensile strength decreases. Therefore, if a film possessing high tensile strength is desired, the amount of plasticizer should be kept near the lower limit. As was noted above, the compatibility of the phosphate ester increases with a decrease in percent hydrolysis and with a decrease in viscosity.

Polyvinyl alcohol films prepared from the type of polyvinyl alcohol described above and plasticized with the phosphate ester possess very excellent properties, and it is not necessary to add a secondary plasticizer. However, small amounts of humectant type plasticizers, such as glycerin and 1,3-butanediol, may be added in amounts up to about 15 parts per 100 parts of polyvinyl alcohol in addition to the phosphate ester without adversely affecting the properties of the films. It is sometimes advisable to add such a humectant type plasticizer if more than 40 parts of the phosphate ester are employed in order to reduce the temperature required for heat sealing the films. It has also been discovered that the addition of small quantities of a humectant type plasticizer allows the addition of slightly greater quantities of phosphate ester to a particular polyvinyl alcohol. Thus, if the amount of phosphate ester which is desired is at about the limit of compatibility small quantities of a humectant type plasticizer may be employed.

Films which are suitable for packaging way be formed from the plasticized polyvinyl alcohol by either extrusion or casting techniques.

The following example is illustrative of the present invention.

EXAMPLE

An aqueous solution containing 12% by weight of polyvinyl alcohol having a percent hydrolysis of 82% and a viscosity measured in a 4% aqueous solution at 20° C. of 22 centipoises was produced by mixing the polyvinyl alcohol with water and heating to 90° C. 35 parts by weight of Vircol 189 per 100 parts by weight of dry polyvinyl alcohol were added to the polyvinyl alcohol solution and the solution mixed with mild agitation for about 5 minutes. This solution was cast on a glass plate at room temperature using a 30 mil drawdown blade. The film was dried at room temperature for about 7 hours and a film having a thickness of 2 mil was removed from the plate. A visual examination of the film indicated that the film was clear.

In Table 1 below, films were made by the same method as that described in the example. Column 1 of the table

*Table 1*

| Viscosity | Percent Hydrolysis | Parts Vircol 189 | Parts 1,3-butanediol | Film Property | Low Temperature Flexibility | | |
|---|---|---|---|---|---|---|---|
| | | | | | Excellent | Fair | Poor |
| 24 | 87.3 | 25 | | Slightly hazy | | | X |
| 24 | 87.3 | 30 | | Hazy | | | X |
| 24 | 87.3 | 30 | 5 | do | | | X |
| 26 | 87 | 25 | | do | | | X |
| 26 | 87 | 30 | | do | | | X |
| 24 | 85.4 | 25 | | Clear | | | X |
| 24 | 85.4 | 30 | | do | | | X |
| 24 | 85.4 | 30 | 5 | do | | X | |
| 24 | 85.4 | 35 | | Hazy | | | X |
| 24 | 85.4 | 40 | | do | | | X |
| 25 | 85 | 25 | | Clear | | | X |
| 25 | 85 | 30 | | do | | | X |
| 25 | 85 | 35 | | do | | | X |
| 25 | 85 | 35 | 5 | do | | | X |
| 25 | 85 | 40 | | Slightly hazy | | X | |
| 22 | 83.5 | 35 | | Clear | X | | |
| 24 | 83 | 25 | | do | | | X |
| 24 | 83 | 30 | | do | | X | |
| 24 | 83 | 35 | | do | | X | |
| 24 | 83 | 35 | 5 | do | | X | |
| 24 | 83 | 40 | | do | | X | |
| 22 | 82 | 25 | | do | | | X |
| 20 | 82 | 30 | | do | | X | |
| 20 | 82 | 35 | | do | X | | |
| 20 | 82 | 40 | | do | X | | |
| 22 | 82 | 35 | 5 | do | | X | |
| 22 | 82 | 35 | 10 | do | | X | |
| 24 | 81 | 25 | | do | | X | |
| 24 | 81 | 30 | | do | | X | |
| 24 | 81 | 35 | | do | | X | |
| 24 | 81 | 35 | 5 | do | | X | |
| 24 | 81 | 40 | | do | X | | |
| 18.9 | 79 | 25 | | do | | | X |
| 18.9 | 79 | 30 | | do | | | X |
| 18.9 | 79 | 35 | | do | | X | |
| 18.9 | 79 | 40 | | do | | X | | indicates the viscosity of the polyvinyl alcohol used, measured in a 4% aqueous solution at 20° C. and column 2 gives the percent hydroylsis of the polyvinyl alcohol. The number of parts of Vircol 189 based on 100 parts of dry polyvinyl alcohol is given in column 3. The film characteristic as observed by visual inspection is given in column 4. The low temperature flexibility of the films were tested as follows, and the results are reported in columns 5, 6 and 7. The polyvinyl alcohol film was conditioned at 72° F. and 50% relative humidity and made in pouches 2" x 2" by heat sealing three edges of the film at a temperature of from 350 to 360° F. under 40 lbs. pressure for 5/10 of a second. The pouches were filled with 2 oz. of "Tide," sealed and placed into desiccators which were filled with a mixture of solid calcium chloride-hexahydrate and a saturated calcium chloride solution. The films were kept in these desiccators at 50° C. for 48 hours with the relative humidity inside the desiccators maintained from 15 to 20%. After the conditioning period the pouches were removed from the desiccators, placed into polyethylene bags which were sealed and further conditioned for a period of 48 hours at −22° C., and the sealed-in pouches were dropped from a height of 6 feet on to a concrete floor. If the pouch was broken the low temperature flexibility was designated as poor. If the pouch remained substantially intact with only small cracks developing the low temperature flexibility was fair. If the pouch was completely intact with none of the soap powder escaping the low temperature flexibility was rated as excellent.

Films prepared in the manner described in the example were conditioned at 72° F. and 50% relative humidity and tested for tensile strength, elongation and 100% modulus at 0% relative humidity and at 80% relative humidity in an Instron tester by pulling standard dumbbells with a crosshead speed of 2 inches per minute. The results of these tests are presented in Table 2.

water solubility characteristics of the films. In Table 3 the water solubility characteristics of various unplasticized polyvinyl alcohol films are given. The water solubility was determined by conditioning a 4 inch square 2 mil film prepared according to the procedure of the example without the addition of a plasticizer at 72° F. and 50% relative humidity for 24 hours. The film was added to 2000 cc. of distilled water, maintained at 23° C. and 50° C. The water was agitated at approximately 200 r.p.m. using a magnetic stirrer. The time in seconds for the initial breakdown of the film is recorded in the column labeled Disintegration and the time in seconds for the dissolution of the film is recorded in the column labeled Dissolution.

*Table 3*

| Viscosity | Percent Hydrolysis | Water Solubility | | | |
|---|---|---|---|---|---|
| | | 23° C. | | 50° C. | |
| | | Disintegration | Dissolution | Disintegration | Dissolution |
| 30 | 90 | 35 | 55 | 15 | 25 |
| 28 | 90 | 20 | 55 | 15 | 30 |
| 23 | 87.4 | 28 | 35 | 20 | 35 |
| 24 | 87.4 | 25 | 35 | 10 | 25 |
| 24 | 87.3 | 25 | 35 | 12 | 20 |
| 26 | 87.0 | 30 | 45 | 13 | 30 |
| 23 | 86 | 25 | 60 | 15 | 90 |
| 24 | 85.4 | 22 | 30 | 13 | 20 |
| 25 | 85 | 30 | 45 | 12 | 25 |
| 22 | 83.5 | 25 | 60 | 10 | 90 |
| 24 | 83 | 20 | 35 | 28 | 70 |
| 25 | 83 | 33 | 55 | 15 | 25 |
| 20 | 82 | 28 | 120 | 18 | 150 |
| 22 | 82 | 28 | 50 | 15 | 35 |
| 24 | 81 | 25 | 45 | 12 | 28 |
| 18.9 | 79 | 28 | 50 | 30 | 45 |

Obviously many modifications and variations of the invention as hereinbefore set forth may be made without departing from the spirit and scope thereof and therefore

*Table 2*

| Viscosity | Percent Hydrolysis | Parts Vircol 189 | Parts 1,3-butanediol | Mechanical Properties | | | | | |
|---|---|---|---|---|---|---|---|---|---|
| | | | | 0% R.H. | | | 80% R.H. | | |
| | | | | Tensile (p.s.i.) | Elongation (percent) | 100% Modulus (p.s.i.) | Tensile (p.s.i.) | Elongation (percent) | 100% Modulus (p.s.i.) |
| 24 | 87.3 | 25 | | 8,925 | 63 | | 4,805 | 695 | 1,070 |
| 24 | 87.3 | 30 | | 8,545 | 55 | | 5,080 | 680 | 1,135 |
| 24 | 87.3 | 30 | 5 | 9,033 | 155 | 7,920 | 4,510 | 690 | 1,055 |
| 24 | 85.4 | 25 | | 10,255 | 150 | 9,335 | 3,510 | 700 | 810 |
| 24 | 85.4 | 30 | | 8,500 | 175 | 7,370 | 3,760 | 785 | 870 |
| 24 | 85.4 | 30 | 5 | 12,035 | 165 | 10,340 | 3,940 | 785 | 860 |
| 24 | 85.4 | 35 | | 8,115 | 215 | 6,070 | 3,285 | 785 | 610 |
| 24 | 85.4 | 40 | | 7,550 | 285 | 4,830 | 2,810 | 775 | 630 |
| 25 | 85 | 25 | | ¹7,970 | 170 | 6,805 | 3,230 | 775 | 685 |
| 25 | 85 | 30 | | ¹8,970 | 190 | 7,325 | 3,065 | 765 | 725 |
| 25 | 85 | 35 | | ¹8,540 | 270 | 5,675 | 3,010 | 795 | 605 |
| 25 | 85 | 35 | 5 | ¹7,645 | 270 | 5,160 | 2,745 | 810 | 600 |
| 25 | 85 | 40 | | 7,190 | 220 | 5,280 | 2,610 | 840 | 555 |
| 24 | 83 | 25 | | ¹7,350 | 195 | 5,735 | 2,735 | 725 | 630 |
| 24 | 83 | 30 | | ¹8,310 | 210 | 6,320 | 2,865 | 830 | 590 |
| 24 | 83 | 35 | | ¹8,035 | 225 | 5,935 | 2,200 | 860 | 505 |
| 24 | 83 | 35 | 5 | ¹7,260 | 255 | 5,030 | 2,010 | 840 | 425 |
| 24 | 83 | 40 | | 7,980 | 225 | 5,815 | 2,945 | 780 | 945 |
| 22 | 82 | 25 | | 15,340 | 200 | 12,310 | 3,600 | 725 | 815 |
| 22 | 82 | 30 | | 8,210 | 205 | 6,370 | 3,015 | 810 | 670 |
| 22 | 82 | 35 | 5 | 7,395 | 245 | 5,120 | 2,240 | 910 | 530 |
| 22 | 82 | 35 | 10 | 7,020 | 200 | 5,620 | 2,395 | 910 | 550 |
| 22 | 82 | 40 | | 7,465 | 280 | 4,585 | 2,800 | 835 | 535 |
| 24 | 81 | 25 | | ¹7,575 | 195 | 5,150 | 2,895 | 770 | 580 |
| 24 | 81 | 30 | | ¹8,830 | 265 | 5,840 | 3,225 | 730 | 490 |
| 24 | 81 | 35 | | ¹7,980 | 265 | 5,220 | 2,510 | 870 | 480 |
| 24 | 81 | 35 | 5 | ¹6,395 | 310 | 3,320 | 2,085 | 860 | 420 |
| 24 | 81 | 40 | | 6,700 | 220 | 4,775 | 2,690 | 840 | 500 |
| 18.9 | 79 | 25 | | 6,950 | 200 | 6,895 | 3,680 | 810 | 555 |
| 18.9 | 79 | 30 | | 8,705 | 240 | 5,955 | 3,375 | 845 | 540 |
| 18.9 | 79 | 35 | | 8,360 | 290 | 4,940 | 2,980 | 800 | 480 |
| 18.9 | 79 | 40 | | 7,425 | 290 | 4,675 | 2,740 | 835 | 480 |

¹ =20% R.H.

All of the polyvinyl alcohol films which were formed from polyvinyl alcohol having a percent hydrolysis of 90% or less possessed acceptable cold water solubility without the presence of a plasticizer. The addition of the Vircol 189 plasticizer did not affect appreciably the only such limitations should be imposed as are indicated in the appended claims.

I claim:

1. A composition consisting essentially of polyvinyl alcohol having a percent hydrolysis of from 79 to 86% and a plasticizer consisting essentially of a mixed phosphate ester represented by the formula $$(C_4H_9O)_xPO[O(CH_2CH_2O)_yH]_{3-x}$$

wherein $x$ is an integer of from 1 to 2 and $y$ is an integer from 1 to 4, said plasticizer being present in an amount of from about 30 to about 45 parts by weight based on 100 parts by weight of polyvinyl alcohol.

2. A composition consistintg essentially of polyvinyl alcohol having a percent hydrolysis of from 80 to 84% and a plasticizer consisting essentially of a mixed phosphate ester represented by the formula $$(C_4H_9O)_xPO[O(CH_2CH_2O)_yH]_{3-x}$$

wherein $x$ is an integer of from 1 to 2 and $y$ is an integer of from 1 to 4, said plasticizer being present in an amount of from about 35 to about 40 parts by weight based on 100 parts by weight of polyvinyl alcohol.

3. An aqueous film forming composition consisting essentially of an aqueous solution of polyvinyl alcohol, said polyvinyl alcohol having a percent hydrolysis of from 79 to 86% and a plasticizer consisting essentially of a mixed phosphate ester represented by the formula $$(C_4H_9O)_xPO[O(CH_2CH_2O)_yH]_{3-x}$$

wherein $x$ is an integer of from 1 to 2 and $y$ is an integer of from 1 to 4, said plasticizer being present in an amount of from about 30 to about 45 parts by weight based on 100 parts by weight of polyvinyl alcohol, said aqueous solution containing from about 5 to about 30% by weight of polyvinyl alcohol based on a combined weight of polyvinyl alcohol and water.

4. An aqueous film forming composition consisting essentially of an aqueous solution of polyvinyl alcohol, said polyvinyl alcohol having a percent hydrolysis of from 80 to 84% and a plasticizer consisting essentially of a mixed phosphate ester represented by the formula $$(C_4H_9O)_xPO[O(CH_2CH_2O)_yH]_{3-x}$$

wherein $x$ is an integer of from 1 to 2 and $y$ is an integer of from 1 to 4, said plasticizer being present in an amount of from about 30 to about 45 parts by weight based on 100 parts by weight of polyvinyl alcohol, said aqueous solution containing from about 5 to about 30% by weight of polyvinyl alcohol based on a combined weight of polyvinyl alcohol and water.

5. A clear, water soluble, shaped article having good low temperature flexibility consisting essentially of polyvinyl alcohol having a percent hydrolysis of from 80 to 84% and a mixed phosphate ester represented by the formula $$(C_4H_9O)_xPO[O(CH_2CH_2O)_yH]_{3-x}$$

wherein $x$ is an integer of from 1 to 2 and $y$ is an integer of from 1 to 4, said mixed phosphate ester being present in an amount of from about 30 to about 45 parts by weight based on 100 parts by weight of polyvinyl alcohol.

References Cited in the file of this patent

UNITED STATES PATENTS

| | | |
|---|---|---|
| 2,950,271 | Snyder | Aug. 23, 1960 |
| 2,990,421 | Melton et al. | June 27, 1961 |
| 3,066,121 | Martin et al. | Nov. 27, 1962 |

OTHER REFERENCES

Golding: "Polymers and Resins," D. Van Nostrand Co. Inc., Princeton, N.J., 1959.

Mellan: "The Behavior of Plasticizers," Pergamon Press, N.Y., 1961.